May 31, 1932.                R. CHILTON                1,860,851
                           YIELDING CLUTCH
                         Filed May 15, 1930

INVENTOR.
ROLAND CHILTON.
BY
    ATTORNEY.

Patented May 31, 1932

1,860,851

UNITED STATES PATENT OFFICE

ROLAND CHILTON, OF RIDGEWOOD, NEW JERSEY, ASSIGNOR TO WRIGHT AERONAUTICAL CORPORATION, A CORPORATION OF NEW YORK

YIELDING CLUTCH

Application filed May 15, 1930. Serial No. 452,595.

My invention relates to yielding clutches or driving devices that are used to connect a driving member subject to speed variations to a driven member having considerable inertia, in such a manner that sudden or cyclical variations of driving speed cannot build up or set up unsafe stresses or shocks in either the clutch, driving or driven members.

More specifically, my invention is designed to connect an internal combustion aviation engine to an impeller or supercharger rotor.

Impellers or supercharger rotors are necessarily of appreciable weight and are usually driven at several times engine speed. With a rigid drive considerable trouble has been experienced with breakages and excessive wear of the gear train.

These troubles are caused partly by inertia effects due to the often sudden variations of engine speed made necessary by the exigencies of flying, and partly by the cyclical speed variations of the engine itself, including those from torsional deflections in the crankshaft.

In order to meet the requirements of this application the clutch should have the following characteristics:—

1. The ability to exert more torque in one direction than in the other;
2. Allow the impeller or supercharger to overrun when the engine speed is suddenly decreased and to slip when suddenly increased;
3. Capable of being incorporated in an existing gear without other change in the design of the associated structure;
4. Freedom from appreciable wear;
5. Be light in weight and inherently balanced;
6. Self lubricating and without adjustments;
7. Low cost and ease of manufacture;
8. Should not add to the momentum of the system.

These objects and others, that will appear from the description, are realized by the mechanism shown in the drawings of which:—

Similar parts in the various figures are designated by the same numbers.

In the figures:—

Figure 2:
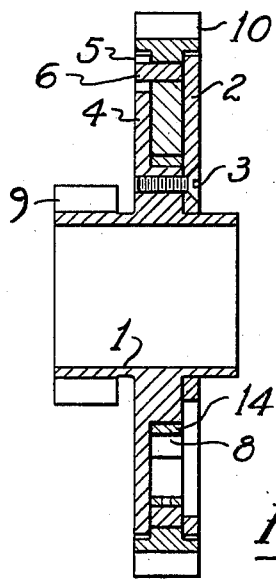
Fig. 2 is a section thru the axis of the driving shaft hub.
Figure 1:
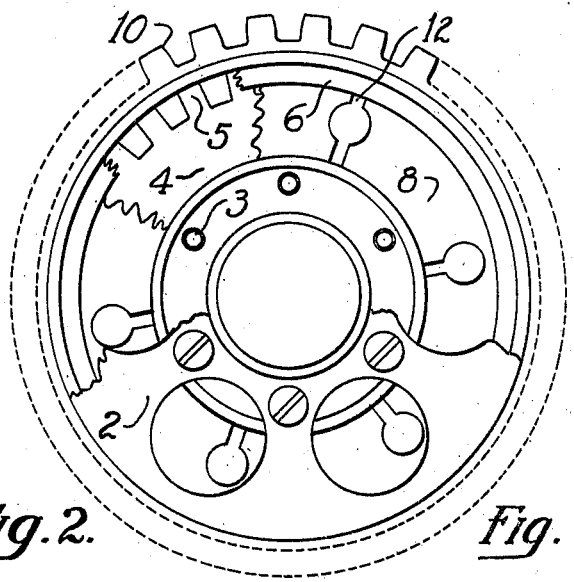
Fig. 1 is a side elevation of a yielding clutch constructed according to my invention, having parts broken away to show the underlying parts more clearly.

1 is the hub on which is secured, preferably integrally, the driving gear 9 and the flange 4. It will be noted that the flange 4 has a number of teeth or lugs 5 formed at one portion of its periphery, the purpose of which will appear further on.

2 is a detachable flange secured to the hub 1 by suitable fastenings such as the screws 3.

10 is the driven ring gear having a thick but shallow web. It is a free running fit between the flanges 2 and 4 and on the ring 6.

6 is a clutch ring having teeth or lugs 7 of the same pitch and number as the tooth spaces on the flange 4 thus forming the driving means for the ring 6. It is split at 13 adjacent the driving splines as shown.

8 is a weight of annular form, preferably made as shown with six segments all flexibly joined together except at the point 12 which is cut thru. It may, however, be made of independent segments of any suitable number. This weight is a free running fit between the flanges 2 and 4, and on the bushing 14 on the hub 1. It is, however, preferably made a close fit inside the ring 6. It should be noted that the weight is not rotationally anchored in any manner. However, owing to the viscosity of the large area of oil film, the weight quickly acquires the same mean angular velocity as the hub.

The operation of the device is as follows: As power is applied to the gear 9, the hub 1, flanges 2 and 4 and clutch ring 6 are positively rotated. The gear 10, being in mesh with the gear on the impeller or supercharger drive shaft, may be, neglecting the drag due to the viscosity of the oil between all the surfaces, initially held from turning by the friction and inertia of the driven parts.

As the speed of 9 increases to the point where the weight 8 is expanded radially by centrifugal force it expands the ring 6, which thus drives the ring gear 10 thus establishing a frictional drive to the gear 10 and the impeller gear connected with it (not shown). If the speed of gear 9 is constant, and the resistance to turning of the impeller is less than the frictional torque between 6 and 10, the impeller or supercharger will be driven at a speed determined by the ratios of the gear train. If, however, the engine speed suddenly increases the inertia of the impeller overcomes the frictional resistance between 6 and 10 and slippage occurs, thus relieving the parts of undue strains and shock.

Figure 3:
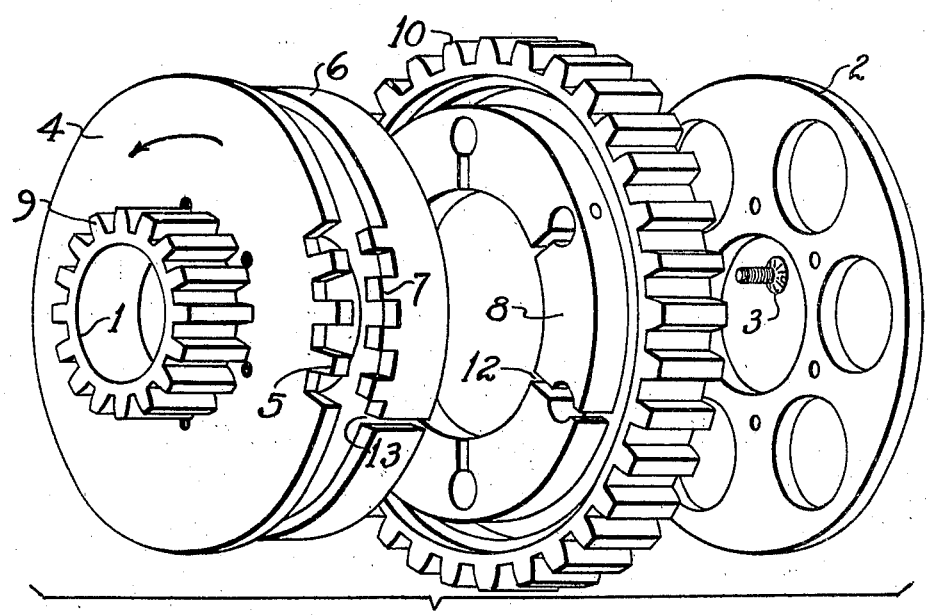
Fig. 3 is a perspective view of a yielding clutch constructed according to my invention showing the parts thereof unassembled and separated and showing in order from left to right the driving gear with integral hub and flange, the clutch ring, the operating weight, the driven gear, and the detachable retaining flange.

Owing to the method of driving the ring 6 from one end only, acceleration of the engine tends to increase the expansion of the ring by the well known wrapping action and thus automatically increases its driving torque. It is to be noted that the hub is normally driven in the direction of the arrow A shown in Fig. 3.

If, on the other hand, the engine is suddenly throttled or the speed otherwise reduced, as from torsional vibration of the crankshaft, the inertia of the impeller or supercharger rotor causes it to overrun, because the gear 10 slips on the ring 6, the one end drive of the ring 6 acting, in this case, to contract the ring and thus automatically reduce its driving torque. The parts are thus automatically relieved of strain and shock.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What I claim is:

1. A yielding clutch comprising an expansible ring; a second ring concentric with the first and surrounding it; a split ring made up of weighted members positioned within the expansible ring and adapted to be spread by centrifugal force to cause the expansible ring to contact firmly with the outer ring and driving means engaging said expansible ring at one end only.

2. A yielding clutch comprising a driving member; a flange secured to said driving member; a split ring adapted to be driven by said flange; a driving connection between the flange and one end of the split ring; a driven member surrounding the split ring and with which said ring is adapted to contact; and an expansible ring positioned within said split ring, made up of weighted members and adapted to be spread by centrifugal force to urge the first ring into firmer contact with the driven member.

3. A yielding clutch comprising an expansible split ring clutch member; a second ring concentric with the first and surrounding it; a split ring made up of weighted members positioned within the expansible ring and adapted to be spread by centrifugal force to cause the expansible ring to contact firmly with the outer ring; and driving means engaging the expansible ring at one end only.

4. A yielding clutch comprising a driving member; a flange secured to said driving member; teeth formed on said flange; a split ring adapted to be driven by said flange; teeth formed on one end of said split ring and adapted to mesh with the teeth on the flange; and a driven member surrounding the split ring and with which the ring is adapted at times to contact firmly whereby, when the driving member tends to turn in one direction relative to the driven member, the split ring expands and a friction clutch is formed between it and the driven member.

5. A yielding clutch comprising a driving member; a flange secured to said driving member; teeth formed on said flange; a split ring adapted to be driven by said flange; teeth formed at one end of said split ring and adapted to mesh with the teeth on said flange; a driven member surrounding the split ring and with which the ring is adapted to contact; and another split ring made up of weighted members positioned within the first named split ring and adapted to be spread by centrifugal force to cause the first named split ring to contact more firmly with the outer ring.

6. A yielding clutch comprising a driving member; a flange secured to said driving member; a split ring adapted to be driven by said flange; a driving connection between the flange and one end of the split ring; a driven member surrounding the split ring and with which the ring is adapted to contact; a second flange positioned on the opposite side of said driven member from the first named flange; and means for securing said second flange to said first named flange whereby the driven member is maintained in operative relationship with the split ring and the driving flange.

7. A yielding clutch comprising a driving flange; an expansible ring driven thereby; an outer ring concentric with the expansible ring and surrounding it; a split ring made up of weighted members positioned within the expansible ring and adapted to be spread by centrifugal force to cause the expansible ring to contact firmly with the outer ring; a second flange positioned on the opposite side of said rings from the first named flange; and means for securing said second named flange to the driving flange whereby the rings are maintained in operative relationship with each other and with the driving flange.

8. A yielding clutch comprising a split expansible ring; means to drive said ring on one side of said split only; a second ring concentric with the first and surrounding it; gear teeth formed on said second ring; and a split ring made up of weighted members, positioned within the expansible ring, and adapted to be spread by centrifugal force to cause the expansible ring to contact firmly with the second ring.

9. A friction clutch comprising in combination a driven member, a split band in frictional contact with said member, means to drivably engage the band toward one end and a weight adapted to expand said band by centrifugal force, said weight being floated rotationally with respect to the other parts set forth.

10. A clutch comprising in combination a hub member, a split friction band drivably connected to the hub member at one side of the split, a centrifugally expansible weight floatingly fitted between the hub and the band, and a driven member frictionally engaged by the band.

11. A yielding clutch comprising a split friction band driven from one end and a weight adapted to expand said band by centrifugal force, said weight being driven by friction only.

12. A yielding clutch comprising a driving member; a flange secured to said driving member; a split ring adapted to be driven by said flange; a driving connection between the flange and one end only of the split ring; a driven member surrounding the split ring and with which said ring is adapted to contact; and an expansible ring positioned within said split ring, made up of weighted members and adapted to be spread by centrifugal force to urge the first ring into firmer contact with the driven member.

13. A yielding clutch comprising a driving member; a flange secured to said driving member; a split ring adapted to be driven by said flange; a driving connection between the flange and one end of the split ring; weights adapted to expand said ring by centrifugal force; a driven member surrounding the split ring and with which the ring is adapted to contact; a second flange positioned on the opposite side of said driven member from the first named flange; and means for securing said second flange to said first named flange whereby the driven member is maintained in operative relationship with the split ring and the driving flange.

14. A yielding clutch comprising an expansible friction ring; a driven member concentric with said ring and surrounding it; centrifugal weights positioned within the expansible ring and adapted to be spread by centrifugal force to cause the expansible ring to contact firmly with the driven member said centrifugal weights being freely floating and driven by friction only; and means for driving said expansible ring.

15. A yielding clutch comprising a driving member provided with a flange; an expansible split ring adapted to be driven by said member; a connection between said driving member and one end of said split ring; an annular driven member surrounding the split ring and with which the ring is adapted to contact, the inner diameter of the opening in said split ring, and in said driven member being relatively large; a second flange positioned on the opposite side of said driven member from the first named flange; and means passing through said openings in the split ring and in the driven member for securing said second flange to said first flange.

16. A yielding clutch comprising an expansible ring; a driven member comprising a second ring concentric with the first and surrounding it; an annular weight positioned within the expansible ring and adapted to be spread by centrifugal force to cause the expansible ring to contact firmly with the outer ring; a driving member formed with a flange; a second flange positioned on the opposite side of said driven member from the first named flange; and means passing through the central openings in said expansible ring, said second ring, and said annular weight for securing said second flange to said first named flange whereby the driven member is maintained in operative relationship with the expansible ring, the annular weight and the driving flange.

In testimony whereof I hereunto affix my signature.

ROLAND CHILTON.